(12) United States Patent
Hussain

(10) Patent No.: US 7,310,100 B2
(45) Date of Patent: Dec. 18, 2007

(54) EFFICIENT GRAPHICS PIPELINE WITH A PIXEL CACHE AND DATA PRE-FETCHING

(75) Inventor: Zahid Hussain, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/879,325

(22) Filed: Jun. 29, 2004

(65) Prior Publication Data

US 2004/0233208 A1 Nov. 25, 2004

Related U.S. Application Data

(63) Continuation of application No. 09/469,558, filed on Dec. 22, 1999, now Pat. No. 6,801,203.

(51) Int. Cl.
*G09G 5/36* (2006.01)
*G06T 11/40* (2006.01)
*G06T 15/40* (2006.01)
*G06T 1/20* (2006.01)

(52) U.S. Cl. ............... 345/557; 345/422; 345/552; 345/506

(58) Field of Classification Search ............... 345/506, 345/418, 419, 545, 557, 537–538, 547, 660, 345/552, 422; 711/118, 169
See application file for complete search history.

(56) References Cited

U.S. PATENT DOCUMENTS 5,170,468 A * 12/1992 Shah et al. ............... 345/537

(Continued)

OTHER PUBLICATIONS

English, R.M. et al., "Loge: A Self-Organizing Disk Controller", *Proceedings of USENIX Winter technical Conference*, Jan. 20-24, 1992, 237-251.

Griffioen, J. et al., "Reducing File System Latency Using a Predictive Approach", *Department of Computer Science*, University of Kentucky, MS-CAC 89-99.

(Continued)

*Primary Examiner*—Kee M. Tung
*Assistant Examiner*—Hau H Nguyen
(74) *Attorney, Agent, or Firm*—Woodcock Washburn LLP

(57) ABSTRACT

An efficient graphics pipeline with a pixel cache and data pre-fetching. By combining the use of a pixel cache in the graphics pipeline and the pre-fetching of data into the pixel cache, the graphics pipeline of the present invention is able to take best advantage of the high bandwidth of the memory system while effectively masking the latency of the memory system. More particularly, advantageous reuse of pixel data is enabled by caching, which when combined with pre-fetching masks the memory latency and delivers high throughput. As such, the present invention provides a novel and superior graphics pipeline over the prior art in terms of more efficient data access and much greater throughput. In one embodiment, the present invention is practiced within a computer system having a processor for issuing commands; a memory sub-system for storing information including graphics data; and a graphics sub-system for processing the graphics data according to the commands from the processor. The graphics sub-system comprises a rasterizer for traversing graphics primitives of the graphics data to generate pixel coordinates for pixels corresponding to the graphics primitives; a graphics pipeline for processing the graphics data of the pixels; and a pixel cache for caching the pixel data. In this embodiment, he graphics sub-system masks the inherent latency of the memory sub-system by pre-fetching the graphics data and storing the graphics data within the pixel cache.

22 Claims, 7 Drawing Sheets

U.S. PATENT DOCUMENTS

| | | | |
|---|---|---|---|
| 5,185,856 A | 2/1993 | Alcorn et al. | 395/130 |
| 5,220,667 A | 6/1993 | Ichieda | 395/700 |
| 5,295,245 A * | 3/1994 | Alcorn et al. | 345/557 |
| 5,333,311 A | 7/1994 | Whipple, II | 395/600 |
| 5,572,657 A * | 11/1996 | Pinedo et al. | 345/562 |
| 5,579,473 A * | 11/1996 | Schlapp et al. | 345/557 |
| 5,673,374 A | 9/1997 | Sakaibara et al. | 395/126 |
| 5,713,008 A | 1/1998 | Falkner | 395/500 |
| 5,764,243 A | 6/1998 | Baldwin | 345/506 |
| 5,801,720 A | 9/1998 | Norrod et al. | 345/526 |
| 5,847,711 A | 12/1998 | Kaufman et al. | 345/424 |
| 5,909,225 A * | 6/1999 | Schinnerer et al. | 345/545 |
| 5,950,007 A | 9/1999 | Nishiyama et al. | 395/707 |
| 5,982,384 A | 11/1999 | Prouty et al. | 345/441 |
| 5,999,183 A | 12/1999 | Kilgariff et al. | 345/418 |
| 6,002,412 A * | 12/1999 | Schinnerer | 345/558 |
| 6,073,232 A | 6/2000 | Kroeker et al. | 713/1 |
| 6,141,025 A * | 10/2000 | Oka et al. | 345/531 |
| 6,181,346 B1 | 1/2001 | Ono et al. | 345/430 |
| 6,353,438 B1 | 3/2002 | Van Hook et al. | 345/552 |
| 6,426,747 B1 | 7/2002 | Hoppe et al. | 345/419 |
| 6,426,753 B1 | 7/2002 | Migdal | 345/506 |
| 6,433,789 B1 | 8/2002 | Rosman | 345/582 |
| 6,456,291 B1 | 9/2002 | Fowler | 345/582 |
| 6,483,516 B1 | 11/2002 | Tischler | 345/552 |
| 6,717,577 B1 * | 4/2004 | Cheng et al. | 345/419 |
| 6,741,256 B2 * | 5/2004 | Emberling | 345/540 |

OTHER PUBLICATIONS

Hatfield, D.J. et al., "Program Restructuring for Virtual Memory", *Program Restructuring*, 1971, 3, 168-192.

Kroeger, T.M. et al., "Predicting File System Actions from Prior Events", *Proceedings of the USENIX Annual Technical Conference*, 1996, 101-110.

Palmer, M. et al., "Fido: A Cache That Learns to Fetch", *Proceedings of the 17th International Conference on Very Large Data Base*, Sep. 1991, 255-264.

Patterson, R. Hugo, et al., "Informed Prefetching and Caching", *Proceedings of the 15th ACM Symp. On Operating System Principles*, 1995, 79-95.

Staelin, C. et al., "Smart Filesystems", *USENIX*, 1991, 45-51.

Tait, Carl D. et al., "Detection and Exploitation of File Working Sets", *IEEE*, 1991, 2-9.

* cited by examiner

EFFICIENT GRAPHICS PIPELINE WITH A PIXEL CACHE AND DATA PRE-FETCHING

CROSS-REFERENCE TO RELATED APPLICATIONS

This application is a continuation application and claims priority under 35 U.S.C. §120 and §121 to U.S. patent application Ser. No. 09/469,558 filed Dec. 22, 1999, now U.S. Pat. No. 6,801,203 which is herein incorporated by reference in its entirety.

BACKGROUND OF THE INVENTION

1. Field of the Invention

The present invention relates to computer graphics technology. More specially, the present invention relates to the design of a graphics pipeline.

2. Related Art

Computer systems are extensively used to perform a wide variety of useful operations in modern society. Applications of computer systems can be found in virtually all fields and disciplines, including but not limited to business, industry, scientific research, education and entertainment. For instance, computer systems are used to analyze financial data, to control industrial machinery, to model chemical molecules, to deliver classroom presentations and to generate special effects for movies. Indeed, it has now come to the point where many of these operations have become so computationally intensive that they cannot be efficiently performed without the help of modern computer systems. As part of the process of performing such operations, computer systems typically utilize some type of display device, such as a cathode ray tube (CRT), a liquid crystal display (LCD) and the like, in order to display images and data which are recognizable to their users. As such, computer systems typically incorporate functionality for generating images and data which are subsequently output to the display device.

One technique for generating computer images and viewable data within a computer system is to utilize a graphics pipeline, which uses a series of interconnected functional blocks of circuitry, or "stages", to render an image. Each stage performs a unique task during each clock cycle. As soon as one stage has completed its task on a pixel, that stage can immediately proceed to work on the next pixel. It does not have to wait for the processing of a prior pixel to complete before it can begin processing the current pixel. More specifically, sets of graphics primitives are specified within the computer system and are subsequently sent down the graphics pipeline. Each stage sequentially performs a different function or functions on the received graphics primitives and then passes that data onto the following stage. Eventually, the graphics pipeline manipulates the graphics primitives in order to produce the final pixel values of an image. Thus, a graphics pipeline enables different graphics data to be processed concurrently, thereby generating graphics images at a higher rate. It should be appreciated that the functionality of a typical prior art graphics pipeline is well known by those of ordinary skill in the art.

However, a typical prior art graphics pipeline does not operate efficiently. More specifically, the memory system used with a typical graphics pipeline inherently has a high memory latency and a high bandwidth. Such a memory system performs optimally when data is bursted in and out of the memory system. Due to this inherent high memory latency, the graphics pipeline often has to wait a long time for requested data to arrive after issuing a memory request. On the other hand, processing in the graphics pipeline cannot proceed until the data is received. As such, the high memory latency adversely impacts the throughput of the graphics pipeline and thus lowers the overall performance of the computer system. As the complexity of graphics applications continue to increase, the performance of computer systems using these prior art graphics pipelines will become even more severely impacted.

Another problem with a typical prior art graphics pipeline is that it uses span traversal during rasterization which causes much unused data to be retrieved, thus resulting in more inefficiency. More particularly, the rasterizer of a typical graphics pipeline traverses the graphics primitives in a span fashion. Unfortunately, span traversal in two-dimensional (2-D) graphics rendering usually results in retrieving a large amount of data that does not end up being used by the pipeline operations. This means that much computing resource is wasted in performing operations that are not useful. Such wasteful use of resource adversely impacts the throughput of the graphics pipeline and thus lowers the overall performance of the computer system.

Thus, there exists a need for a graphics pipeline which does not operate inefficiently due to the high memory latency of the memory system and which does not waste computing resource on operations that are unproductive.

SUMMARY OF THE INVENTION

Accordingly, the present invention provides an efficient graphics pipeline with a pixel cache and data pre-fetching. By combining the use of a pixel cache in the graphics pipeline and the pre-fetching of data into the pixel cache, the graphics pipeline of the present invention is able to take best advantage of the high bandwidth of the memory system while effectively masking the latency of the memory system. More particularly, advantageous reuse of pixel data is enabled by caching, which when combined with data pre-fetching masks the memory latency and delivers high throughput. As such, the present invention provides a novel and superior graphics pipeline over the prior art in terms of more efficient data access and much greater throughput. These and other advantages of the present invention not specifically mentioned above will become clear within discussions of the present invention presented herein.

Specifically, in one exemplary embodiment, the present invention is practiced within a computer system having a processor for issuing commands; a memory sub-system for storing information including graphics data; and a graphics sub-system for processing the graphics data according to the commands from the processor. The graphics sub-system comprises a rasterizer for traversing graphics primitives of the graphics data to generate pixel coordinates for pixels corresponding to the graphics primitives; a graphics pipeline for processing the graphics data of the pixels; and a pixel cache for caching the pixel data. Significantly, in this embodiment, the graphics sub-system of the present invention masks the inherent latency of the memory sub-system by pre-fetching the graphics data and storing the graphics data within the pixel cache.

Another embodiment of the present invention includes the above and wherein the graphics sub-system further comprises a pre-fetch queue for storing cache addresses corresponding to the pixels.

Yet another embodiment of the present invention includes the above and wherein the pre-fetch queue is also for storing the pixel coordinates.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
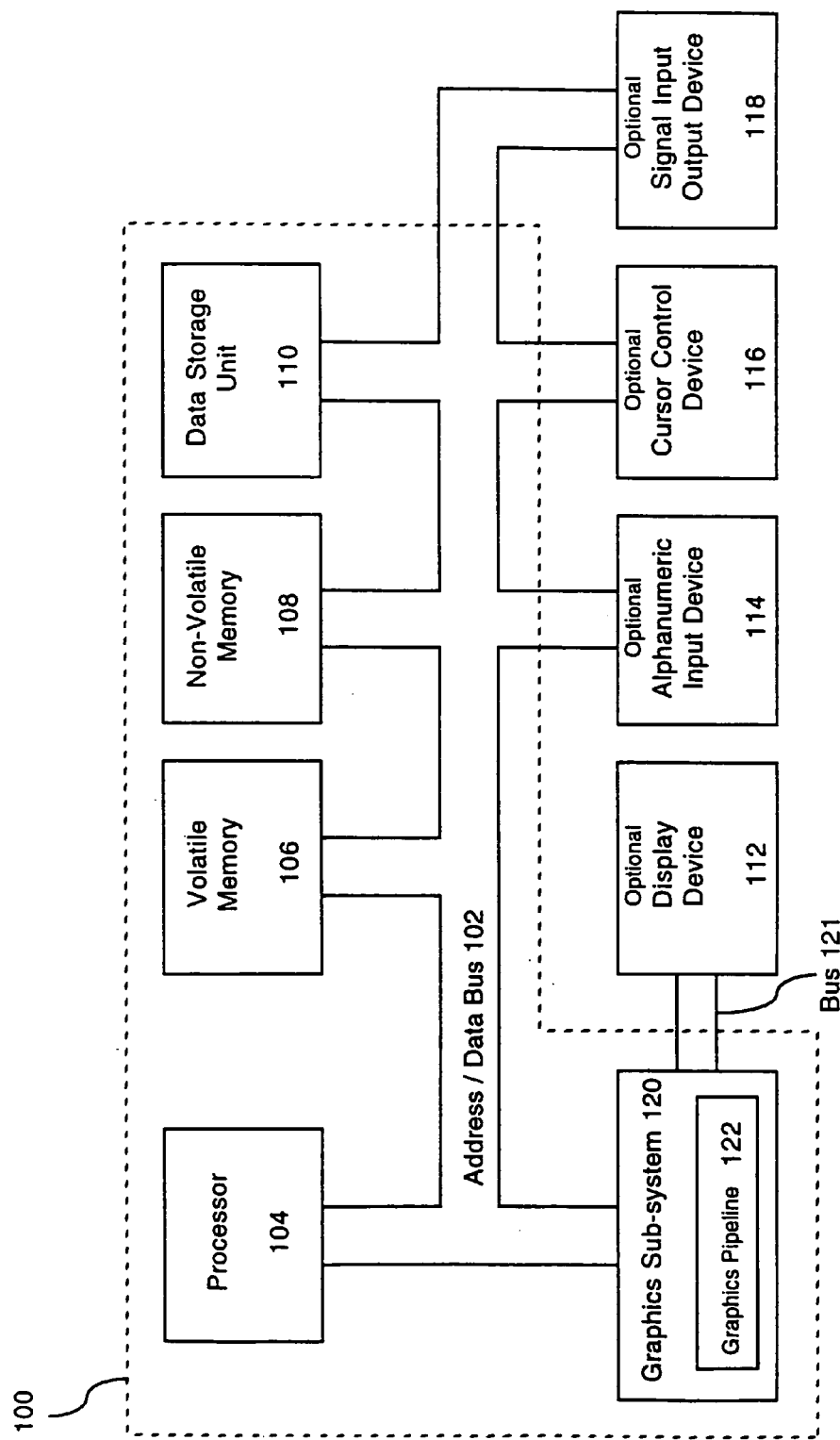
FIG. 1 is a schematic illustration of an exemplary computer system used in accordance with embodiments of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. To the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "issuing", "storing", "processing", "traversing", "pre-fetching" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Figure 4:
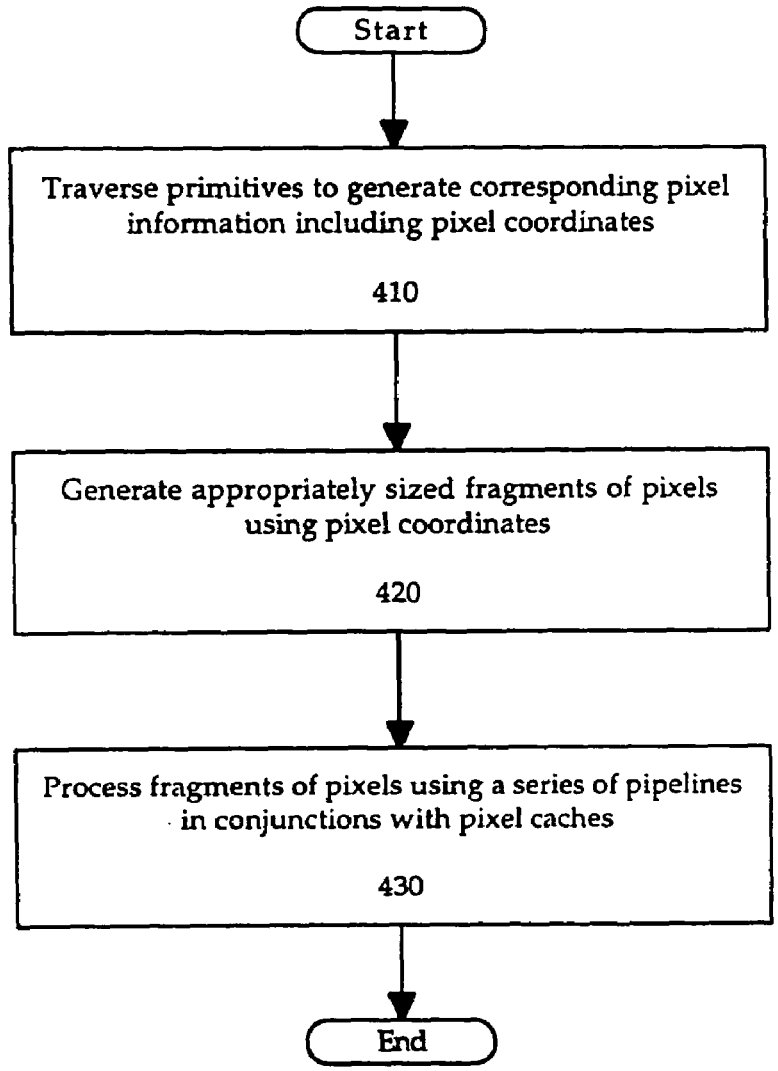
FIG. 4 is a flow diagram illustrating steps for processing pixel data using the graphics sub-system of the present invention.
Figure 6:
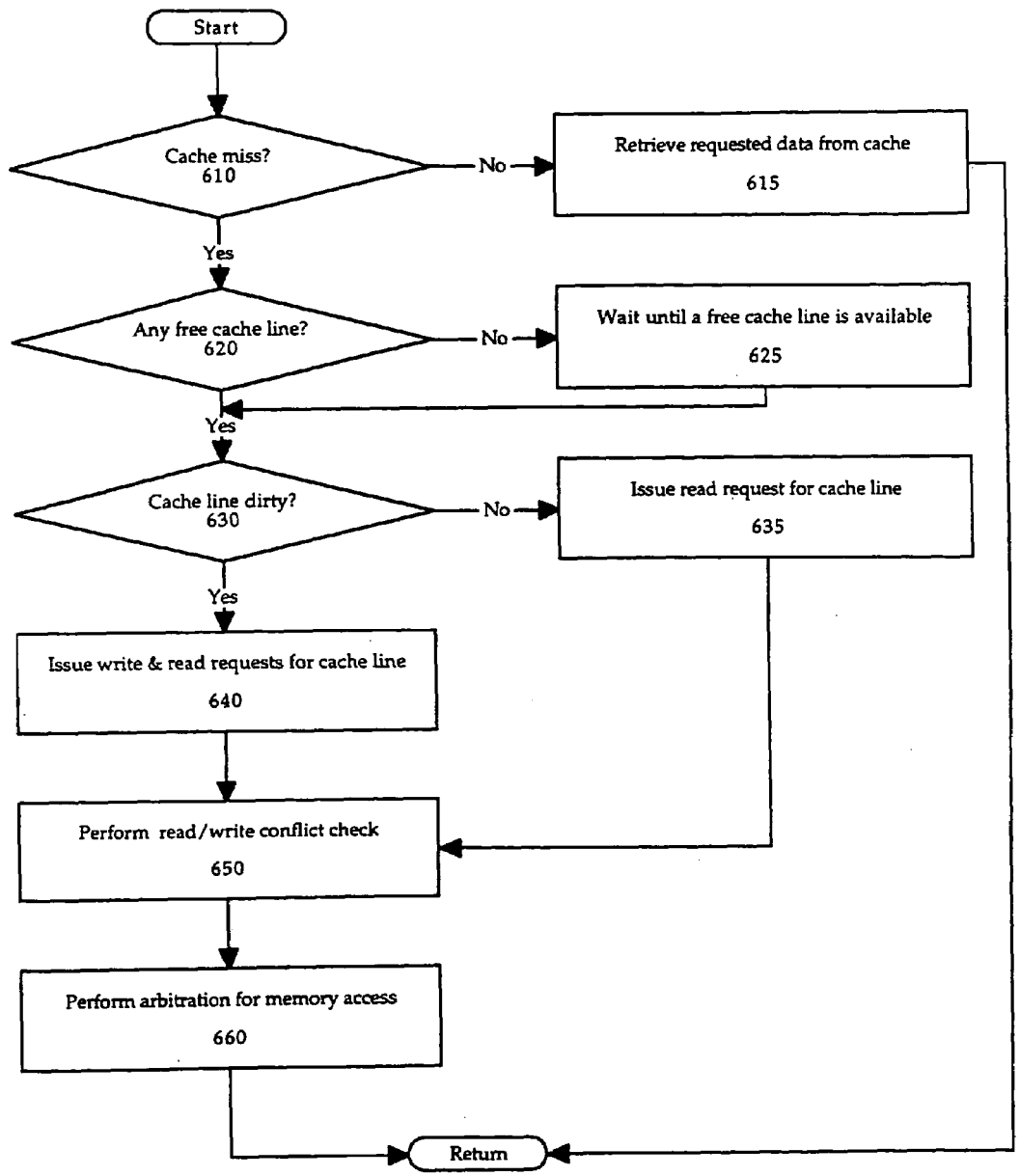
FIG. 6 is a flow diagram illustrating steps for accessing a pixel cache and main memory in accordance with one embodiment of the present invention.
Figure 7:
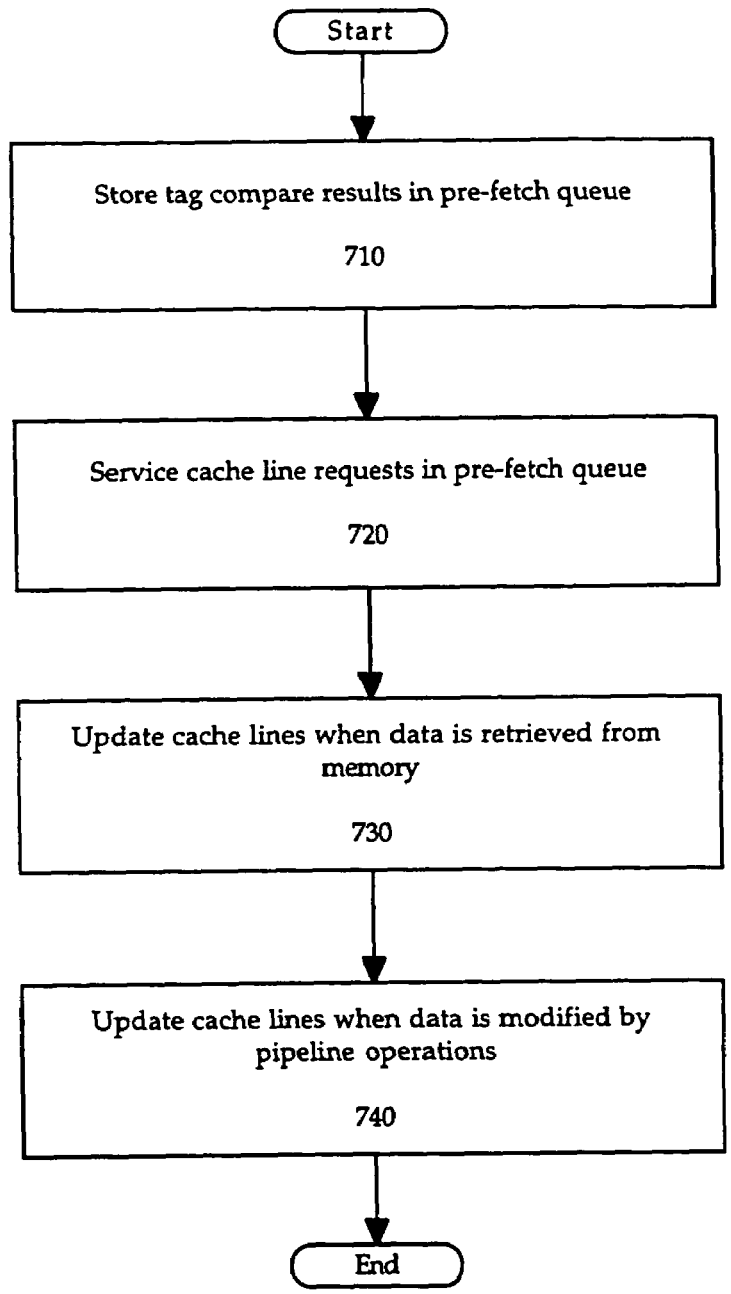
FIG. 7 is a flow diagram illustrating steps for processing graphics data in a graphics pipeline in conjunction with a pre-fetch FIFO and a pixel cache in accordance with one embodiment of the present invention.

Computer System Environment of One Embodiment of the Graphics Pipeline of the Present Invention FIG. 1 illustrates an exemplary computer system 100 used in accordance with embodiments of the present invention. Within the following discussions of the present invention, certain processes and steps are discussed that are realized, in certain embodiments, as a series of computer-readable and computer-executable instructions (e.g., processes 400, 600 and 700 as illustrated in FIGS. 4, 6 and 7, respectively) that reside, for example, in computer-usable media of computer system 100 and executed by processor(s) of computer system 100. When executed, the instructions cause computer system 100 to perform specific actions and exhibit specific behavior which is described in detail below. It is appreciated that system 100 of FIG. 1 is exemplary only and that the present invention can operate within a number of different computer systems including general purpose computer systems, embedded computer systems, and stand-alone computer systems specially adapted for graphics applications.

Computer system 100 of FIG. 1 includes an address/data bus 102 for communicating information, and a central processor unit (CPU) 104 coupled to bus 102 for processing information and instructions. Within the scope of the present invention, processor 104 can be a specialized processor that is optimized for performing graphics operations. Computer system 100 also includes data storage features such as a computer-usable volatile memory 106, (e.g., random access memory (RAM)) coupled to bus 102 for storing information and instructions for central processor unit 104, computer-usable non-volatile memory 108 (e.g., read only memory (ROM)) coupled to bus 102 for storing static information and instructions for central processor unit 104, and a data storage device 110 (e.g., a magnetic or optical disk and disk drive) coupled to bus 102 for storing information and instructions. Optionally, computer system 100 may also include a display device 112 coupled to bus 102 for displaying information (e.g., graphics images), an alphanumeric input device 114 having alphanumeric and function keys and coupled to bus 102 for communicating information and command selections to central processor unit 104, a cursor control device 116 coupled to bus 102 for communicating user input information and command selections to central processor unit 104, and also a signal input output communication device 118 (e.g., a modem) coupled to bus 102.

Display device 112 of FIG. 1, utilized with the present invention, may be a liquid crystal device (LCD), cathode ray tube (CRT), or other display device suitable for creating graphic images and alphanumeric characters recognizable to a user. Optional cursor control device 116 allows the computer user to dynamically signal the two dimensional movement of a visible symbol (cursor) on a display screen of display device 112. Many implementations of cursor control device 116 are known in the art including a trackball, mouse, touch pad or joystick. Alternatively, it will be appreciated that a cursor can be directed and/or activated via input from alphanumeric input device 114 using special keys and key sequence commands. The present invention is also well suited to directing a cursor by other means such as, for example, voice commands.

Computer system 100 of FIG. 1 also provides data and control signals via bus 102 to a graphics sub-system 120. Graphics sub-system 120 contains a graphics pipeline 122, which includes specialized hardware units for processing a series of display instructions found within a memory-stored display list to render graphics primitives. Graphics pipeline 122 supplies data and control signals to a frame buffer (not shown) that refreshes display device 112 for rendering images (including graphics images). Graphics sub-system 120 is coupled to display device 112 by an address/data bus 121, which enables them to communicate information. In embodiments of the present invention, graphics sub-system 120 includes a pixel cache (not shown), which is used in conjunction with graphics pipeline 122 to enhance the performance thereof. In other embodiments, graphics sub-system 120 also includes a FIFO memory for storing pre-fetched data, thereby further improving the performance of graphics pipeline 122. A more detailed discussion of graphics pipeline 122 and the pixel cache of the present invention is found below with reference to FIGS. 2 through 7.

Figure 2:
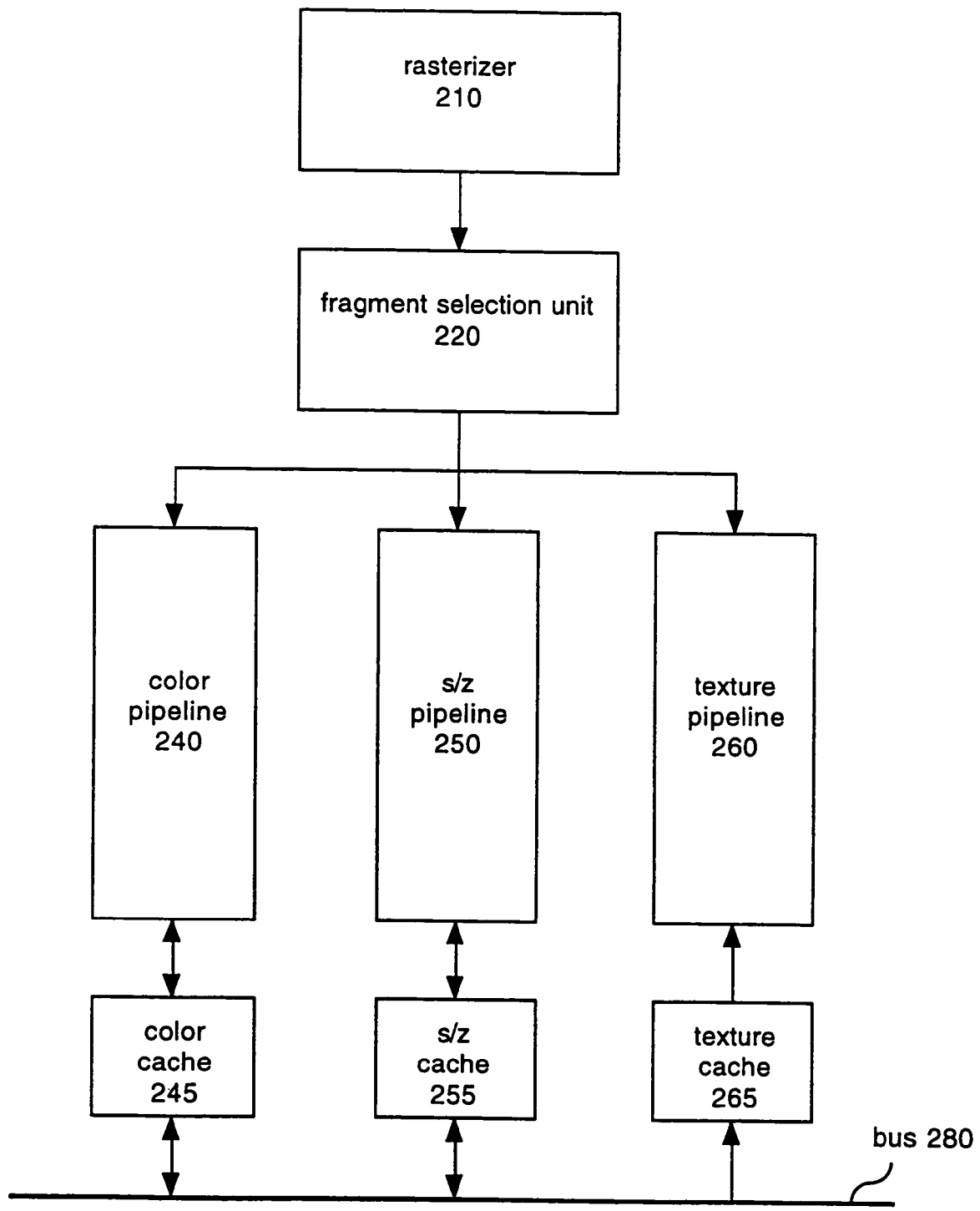
FIG. 2 is a block diagram illustrating the configuration of a graphics sub-system in accordance with one embodiment of the present invention.

General Description of Certain Embodiments of the Graphics Pipeline of the Present Invention With reference next to FIG. 2, a block diagram illustrating the configuration of a graphics sub-system in accordance with one embodiment of the present invention is shown. As illustrated in FIG. 2, in one embodiment of the present invention, graphics sub-system 120 comprises a rasterizer 210. Within the scope of the present invention, rasterizer 210 traverses graphics primitives, such as triangles and lines, to generate information for the corresponding pixels, including their coordinates. Rasterizer 210 is coupled to a fragment selection unit 220, which is in turn coupled to a color pipeline 240, a stencil z-buffer pipeline (s/z pipeline) 250 and a texture pipeline 260. In one embodiment, fragment selection unit 220 receives pixel coordinates from rasterizer 210 and generates appropriately sized fragments, or tiles, of pixels for further processing by color pipeline 240, s/z pipeline 250 and texture pipeline 260 according to commands from processor 104.

Importantly, referring still to FIG. 2, in one embodiment of the present invention, color pipeline 240 is coupled to a pixel cache 245, and stencil z-buffer pipeline 250 is coupled to a pixel cache 255. In this embodiment, pixel cache 245 is used for storing pixel-specific color data and is thus also referred to as color cache 245. Likewise, pixel cache 255 is used for storing pixel-specific stencil z-buffer data and is thus also referred to as stencil z-buffer cache (s/z cache) 255. Texture pipeline 260 is coupled to a texture cache 265 for storing texture data. Moreover, in an embodiment, each of color cache 245, s/z cache 255 and texture cache 265 is independently coupled to a bus 280 for communicating information therewith.

In one embodiment of the present invention, each of the pixel caches (color cache 245 and s/z cache 255) is a set-associative write-back cache. As such, each pixel cache is a multi-port cache having a read-port and a write-port through which the cache is coupled to color pipeline 240 or s/z pipeline 250 as described above. In this embodiment, texture cache 265 is not necessarily a write-back cache, but a write-back cache can be used within the scope of the present invention. As is known in the art, when there is a cache hit (match) in a write-back cache and the cached data needs to be updated, the updated data is written to the cache ("dirtying" the cached data) but not to main memory (e.g., memory 106 of FIG. 1). Updating of main memory is postponed until the updated cached data ("dirty" data) has to be replaced in that cache line.

In one embodiment of the present invention, the write-back scheme described above is implemented by maintaining a "dirty bit" for each cache line in color cache 245 and s/z cache 255. The dirty bit of a particular cache line is set when data in that cache line is updated, or "dirtied." When a cache line needs to be replaced, its dirty bit is examined and if it has been set, the data is written back to main memory before uncached data is brought in from main memory; otherwise, the cache line is simply overwritten without performing a write to main memory. Alternatively, in another embodiment, a cache line can be divided into different sub-blocks and a dirty bit can be maintained for each sub-block. The operation of the write-back scheme remains the same in this alternative embodiment. Being write-back caches, color cache 245 and s/z cache 255 are capable of writing dirty data out to bus 280 for updating main memory according to this write-back scheme.

Referring still to FIG. 2, in a currently preferred embodiment, each of color cache 245 and s/z cache 255 is one (1) kilobyte (kB) in size. Moreover, in this embodiment, each of the 1 kB cache (color cache 245, s/z cache 255) is a fully associative cache and has eight (8) 128-byte cache lines. In addition, a dirty bit is maintained for each 32-byte sub-block of each 128-byte cache line. Furthermore, each cache line is organized as 4×8×32 arrays of pixels in this embodiment. Significantly, in this embodiment, the cache lines are organized as two-dimensional (2-D) arrays with tiles of pixel data. Such cache organization is different from the way that a typical cache is organized. It is appreciated that by storing pixel data (e.g., color data, z-buffer data) in a cache where the cache lines are organized as 2-D arrays with tiles of pixel data, the present invention is able to take maximum advantage of the 2-D spatial locality of graphics rendering. This aspect of the present invention is described in greater detail below with reference to FIG. 5.

Figure 3:
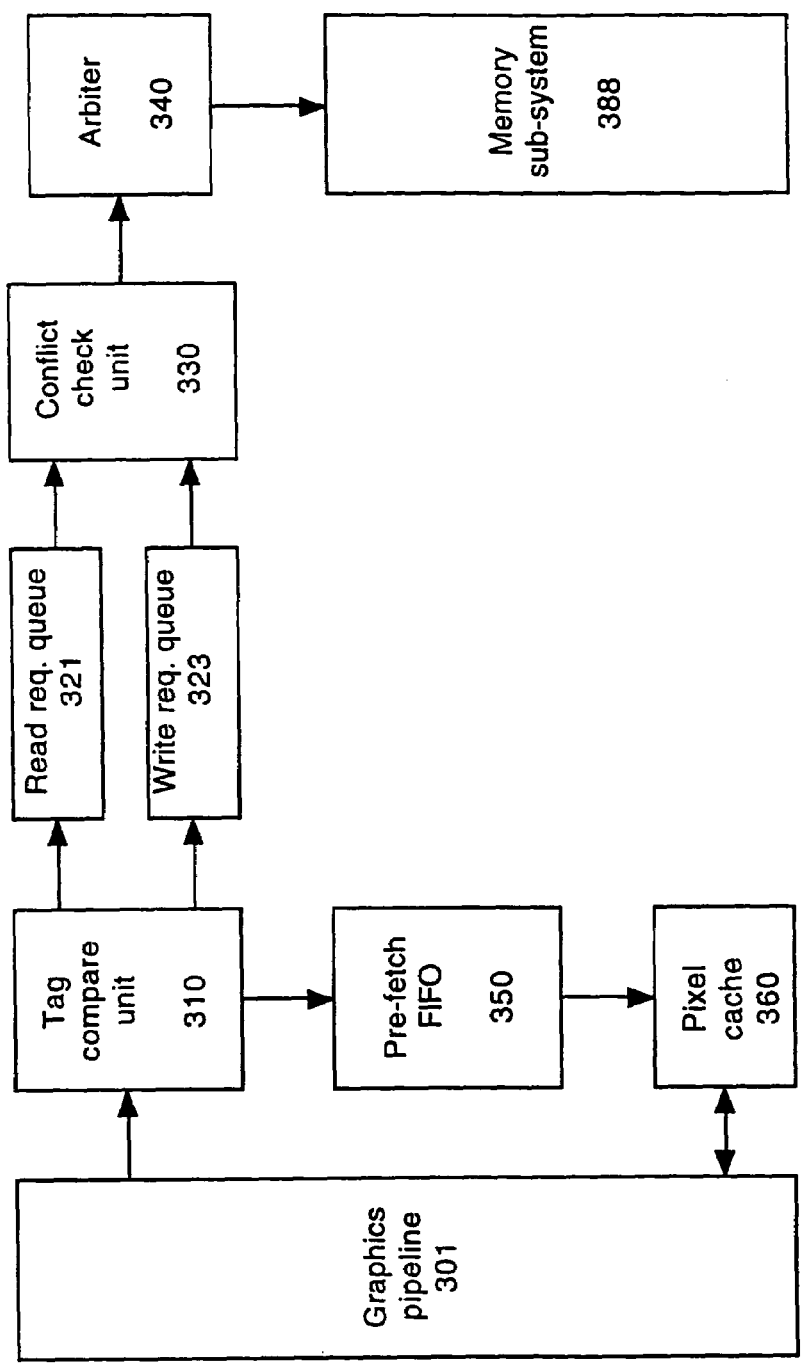
FIG. 3 is a block diagram illustrating the configuration of a graphics pipeline, a pre-fetch FIFO and a pixel cache in accordance with one embodiment of the present invention.

With reference next to FIG. 3, a block diagram illustrating the configuration of a graphics pipeline, a pre-fetch FIFO and a pixel cache in accordance with one embodiment of the present invention is shown. Within the scope of the present invention, a graphics pipeline 301 not only utilizes a pixel cache 360 to cache incoming pixel data but also uses a pre-fetch FIFO 350 to enable pre-fetching of pixel data into pixel cache 360. It is appreciated that graphics pipeline 301 and pixel cache 360 can respectively be a color pipeline and a color cache (e.g., color pipeline 240 and color cache 245 of FIG. 2) or, alternatively, a stencil z-buffer pipeline and a s/z cache (e.g., s/z pipeline 250 and s/z cache 255 of FIG. 2), wherein pixel cache 360 is a set-associative write-back cache.

More particularly, in one embodiment, graphics pipeline 301 is coupled to a tag compare unit 310. Tag compare unit 310 is used to check whether a particular tile of pixel data is already cached. In one embodiment, tag compare unit 310 is coupled to a read-request queue 321 and also a write-request queue 323, which are in turn coupled to a conflict check unit 330. Conflict check unit 330 is coupled to an arbiter 340. Read-request queue 321, write-request queue 323, conflict check unit 330 and arbiter 340 operate together to manage access to memory sub-system 388 (e.g., memory 106 in FIG. 1) when a cache miss is encountered as indicated by tag compare unit 310.

With reference still to FIG. 3, tag compare unit 310 is further coupled to pre-fetch FIFO (first-in first-out) 350. In one embodiment, pre-fetch FIFO 350 comprises a random access memory (RAM). Within the scope of the present invention, pre-fetch FIFO 350 serves as a queue that stores data from tag compare unit 310, which data includes cache line addresses and pixel coordinates. In one embodiment, pre-fetch FIFO 350 is coupled to pixel cache 360, which is used to store tiles of pixel data when the data is retrieved from memory sub-system 388. Significantly, by queuing up the data generated by tag compare unit 310 in pre-fetch FIFO 350, the present invention masks, or minimizes, the memory latency by temporally separating the generation of memory requests and the actual execution of pipeline operations in graphics pipeline 301. In other words, pixel data is "pre-fetched" from memory sub-system 388 and stored within pixel cache 360 before it is needed for the corresponding pipeline operation. As such, after issuing a memory request, graphics pipeline 301 does not have to wait a long time ("stall") for the data to arrive before proceeding with its operation. Therefore, a high throughput can be sustained in graphics pipeline 301.

Referring next to FIG. 4, a flow diagram 400 illustrating steps for processing pixel data using the graphics sub-system of the present invention is shown. It is appreciated that the processing of color data and of s/z data are performed in the same manner within the scope of the present invention. In one embodiment, color data is processed by color pipeline 240 (FIG. 2) in conjunction with color cache 245 (FIG. 2), s/z data is processed by s/z pipeline 250 (FIG. 2) in conjunction with s/z cache 255 (FIG. 2), while texture data is processed by texture pipeline 260 (FIG. 2) in conjunction with texture cache 265 (FIG. 2).

Thus, referring to FIG. 4, in step 410, graphics primitives are traversed to generate information for the corresponding pixels, including their coordinates. In one embodiment, rasterizer 210 (FIG. 2) performs the traversal according to commands issued by processor 104 (FIG. 2). Furthermore, in a currently preferred embodiment, rasterizer 210 traverses the primitives in a manner that is cache-friendly. Specifically, it traverses a hierarchy of tiles of pixels. In contrast to span traversal, such tile traversal is very desirable for implementing caching in graphics rendering because of the spatial locality of 2-D graphics primitives. It is appreciated that span traversal would result in caching much data that is not used. Using tile traversal, the present invention takes best advantage of page node access and allows caching of pixel data to be performed most efficiently.

Figure 5:
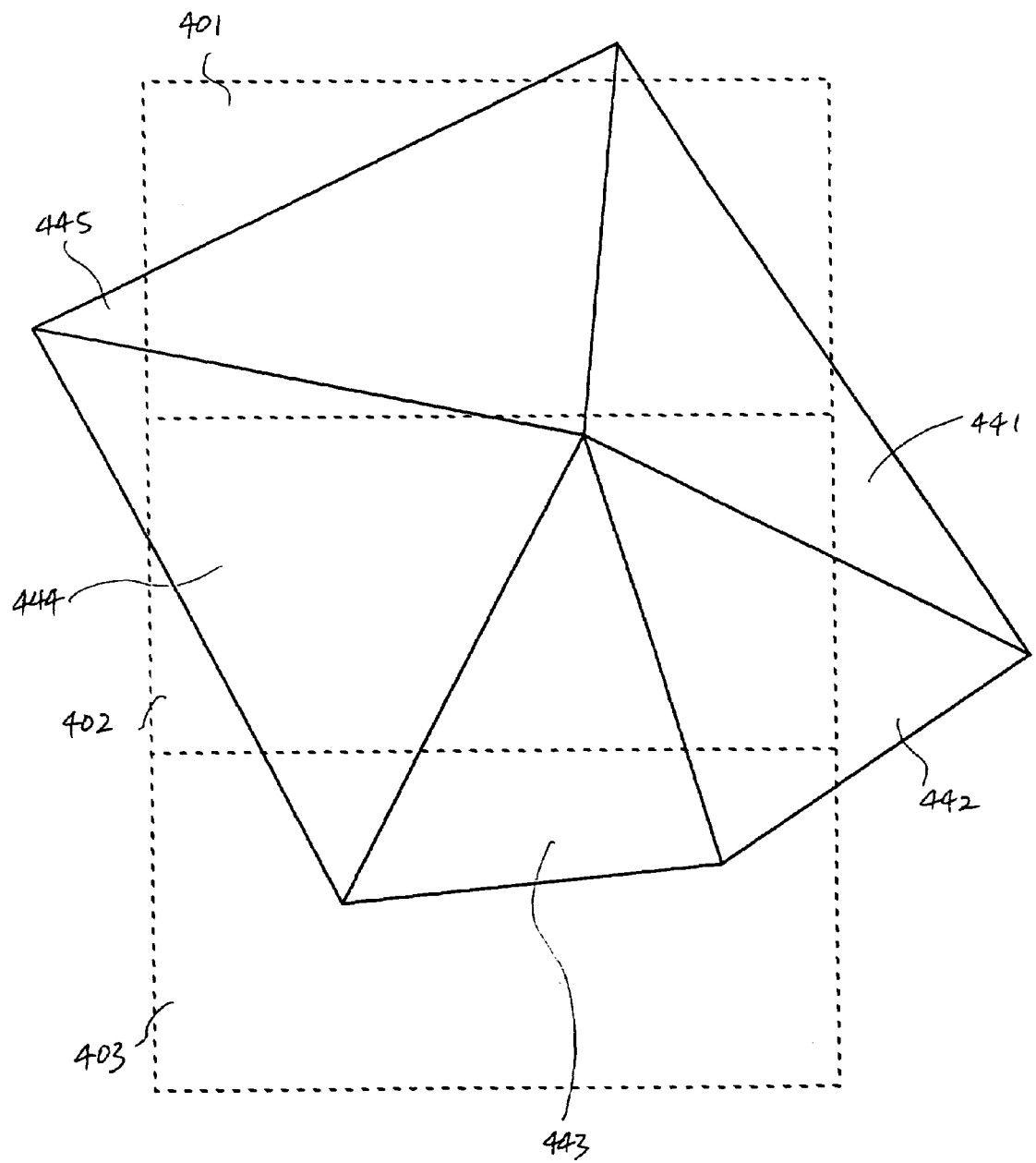
FIG. 5 is a block diagram illustrating the spatial locality of 2-D graphics primitives.

FIG. 5 is a block diagram illustrating the spatial locality of 2-D graphics primitives. In the example shown in FIG. 5, triangles 441, 442, 443, 444 and 445 are graphics primitives, where each of the triangles abuts two other triangles. This is a very typical arrangement of 2-D graphics primitives that needs to be rendered by rasterizer 210 (FIG. 2). The close proximity of the graphics primitives to each other is often referred to as spatial locality in the graphics art. Moreover, in FIG. 5, regions 401, 402 and 403 represent tiles of pixels, hereinafter denoted as tiles 401, 402 and 403. Significantly, when pixel data (e.g., color data, s/z data) is cached in tiles, much of the cached data can be reused, thereby enhancing the cache hit rate and the overall performance of the graphics sub-system. For example, tile 402, among others, is cached for processing triangle 442. In other words, data for all the pixels within tile 402 has been stored in the cache. Subsequently, when adjacent triangles 443 and 444 are processed, much of the already cached pixel data (e.g., tile 402) can be advantageously reused without having to perform additional memory requests because tile 402 intersects both triangles 443 and 444. As such, the spatial locality of 2-D graphics rendering is best exploited by using tile traversal of the 2-D graphics primitives in conjunction with caching of pixel data.

With reference back to FIG. 4, in step 420, appropriately sized fragments, or tiles, of pixels are generated using the pixel coordinates provided by step 410. In one embodiment, fragment selection unit 220 (FIG. 2) is used to generate the appropriately sized fragments.

In one embodiment of the present invention, fragment selection unit 220 receives from rasterizer 210 4×4 fragments (e.g., tiles) of pixel data and divides these fragments into 2×2 fragments, which are suitable for processing by color pipeline 240, s/z pipeline 250 and texture pipeline 260 in terms of fragment size. It is appreciated that 4×4 fragments of pixels are broken down into smaller 2×2 fragments because many typical rasterization operations, such as z-buffering, z-interpolation, blending, etc., do not operate on 4×4 fragments of pixels at a time, but rather on 2×2 fragments of pixels at a time. Thus, fragment selection unit 220 is included in this embodiment to produce appropriately sized fragments of pixels to facilitate such operations.

Referring still to FIG. 4, in step 430, the fragments of pixels generated in step 420 are processed by a series of pipelines in conjunction with pixel caches in accordance with the present invention. In one embodiment, these pipelines include color pipeline 240, s/z pipeline 250 as well as texture pipeline 265 as illustrated in FIG. 2. The processing that occurs in color pipeline 240 and s/z pipeline 250 in conjunction with color cache 245 and s/z cache 255, respectively, is described in greater detail below with reference to FIG. 6.

Referring next to FIG. 6, a flow diagram 600 illustrating steps for accessing a pixel cache and main memory in accordance with one embodiment of the present invention is shown. In flow diagram 600 of FIG. 6, steps are described in terms of a graphics pipeline. It is appreciated that the processing of color data by color pipeline 240 (FIG. 2) and the processing of s/z data by s/z pipeline 250 (FIG. 2) are performed in similar fashion within the scope of the present invention, and as such process 600 applies to processing in color pipeline 240 and also s/z pipeline 250 within the graphics sub-system of the present invention.

Thus, with reference to FIG. 6, in step 610, upon a request for certain pixels from the graphics pipeline, a tag compare is performed to determine whether the requested pixel data is already in the pixel cache or not. In one embodiment, tag compare unit 310 (FIG. 3) examines the incoming pixel coordinates and checks them against each set of the cache to determine whether the requested pixels are resident (e.g., previously cached and still valid, or a cache hit/match) or not (e.g., a cache miss). It is appreciated that the operation of a tag compare is known in the art and thus not described in detail herein. In a currently preferred embodiment, pixels are handled in 2×2 tiles as described above with reference to FIGS. 2 and 5. If a cache miss is encountered, process 600 proceeds to step 620; otherwise, process 600 proceeds to step 615, wherein the requested data is retrieved from the cache.

In step 620, it is determined whether there is a free cache line in the pixel cache that can be replaced. More particularly, since the cache is used with a pipeline, it must first be ascertained that no operation in the pipeline is waiting to access a specific cache line before its content can be safely replaced. In one embodiment, this is achieved by maintaining a state per cache line within tag compare unit 310 to indicate whether a particular cache line is free or not. Specifically, there is a "count" per cache line that indicates how many operations in the pipeline are currently using that cache line. Under this scheme, it is only safe to replace the data in a cache line when its "count" is zero (0). Moreover, in an embodiment where the pixel cache is set-associative, all sets of the cache must be checked. Furthermore, in one embodiment, if there are more than one replaceable set (e.g., having a zero count), then one of those replaceable sets is selected for replacement in a pseudo-random manner. As such, replacement can be distributed across all the sets in the cache. If there is at least one free cache line, process 600 proceeds to step 630; otherwise, if there is no free cache line (e.g., non-zero count in all sets), process 600 proceeds to step 625.

In step 625, the graphics pipeline waits until a free cache line is available. When a free cache line is available, process 600 proceeds to step 630.

In step 630, it is determined whether the cache line selected to be replaced is dirty or not. In one embodiment, step 630 involves checking the dirty bits of each sub-block of the selected cache line to ascertain whether any of those dirty bits are set or not. If any of those dirty bits are set, the cache line is dirty. This means that at least one sub-block in that cache line has been updated and the change(s) have not yet been written back to main memory. If the selected cache line is dirty, process 600 proceeds to step 640; otherwise, process 600 proceeds to step 635.

In step 635, a read request is issued for the uncached data to be retrieved from memory into the selected cache line. In one embodiment, the read request is queued in read request queue 321 (FIG. 3).

In step 640, a write request and a read request are issued with respect to the selected cache line. In this case, in addition to retrieving the uncached data from memory, the content of the dirty cache line needs to be written back to memory as well. Thus, both a read request and a write request are needed. In one embodiment, the read request is queued in read request queue 321 while the write request is queued in write request queue 323 (FIG. 3).

In step 650, a read/write conflict check is performed. Since a write request to write the dirty data from the selected cache line back to memory must occur before uncached data can be read from memory into the same cache line (thus replacing the dirty data), a conflict check between the read and write queues must be performed to ensure that this order is followed such that cache coherency is maintained. In one embodiment, step 650 is performed by conflict check unit 330 (FIG. 3).

In step 660, an arbitration is performed using the conflict check result to determine a proper order of servicing the read and write requests. In one embodiment, step 660 is performed by arbiter 340 (FIG. 3).

Referring next to FIG. 7, a flow diagram 700 illustrating steps for processing graphics data (e.g., pixel data) in a graphics pipeline in conjunction with a pre-fetch FIFO and a pixel cache in accordance with one embodiment of the present invention is shown. In flow diagram 700 of FIG. 7, as is the case in FIG. 6, steps are described in terms of a graphics pipeline. It is appreciated that the processing of color data by color pipeline 240 (FIG. 2) and the processing of s/z data by s/z pipeline 250 (FIG. 2) are performed in similar fashion within the scope of the present invention, and as such flow diagram 700 applies to processing in color pipeline 240 and also s/z pipeline 250 within the graphics sub-system of the present invention.

Thus, with reference to FIG. 7, in step 710, information generated by the tag compare operation of process 600 (FIG. 6) is stored in a pre-fetch queue. More particularly, the tag compare operation has identified the address of a free cache line which can be replaced in the event of a cache miss.

In one embodiment, pre-fetch FIFO 350 (FIG. 3) serves as this pre-fetch queue. Pre-fetch FIFO 350 is a "deep FIFO queue" which can be sized so as to most effectively mask the latency of memory sub-system 388 (FIG. 3) within the scope of the present invention. In one embodiment, pre-fetch FIFO 350 stores the cache line addresses of those cache lines that are to be replaced having been selected by tag compare operations. In another embodiment, pre-fetch FIFO 350 also stores the pixel coordinates of those pixels that have been requested along with their corresponding cache line addresses.

In step 720, the queued requests (e.g., retrieving the data for those cache lines which need to be updated) in the pre-fetch queue are serviced. In one embodiment, the requests are serviced in a first-in, first-out (FIFO) manner. In other words, the requests are fulfilled according to the order in which they are queued.

In step 730, cache lines are updated when the requested pixel data is retrieved from memory. In one embodiment, tag compare unit 310 (FIG. 3) also updates its internal information to reflect the current status of the cache lines.

In step 740, cache lines are updated when the pixel data stored therein is modified by pipeline operations. In one embodiment, the dirty bits corresponding to the modified sub-blocks of those cache lines are also updated to reflect such modifications.

In one embodiment, read/write conflict checks are performed in conjunction with steps 730 and 740 to ensure cache coherency. For example, conflict checking is used to avoid read-after-write hazards and to insure that data being read out from the cache is not about to be updated down the pipeline by another operation.

Importantly, as described above with reference to FIG. 3, by queuing up the data generated by tag compare unit 310 in pre-fetch FIFO 350, the present invention masks the memory latency of memory sub-system 388 by temporally separating the generation of memory requests and the actual execution of pipeline operations in the graphics pipeline. In one embodiment, requests can be stacked up in pre-fetch FIFO 350 and then filled before the pipeline operations that need the data are actually executed. Thus, pixel data can be "pre-fetched" from memory sub-system 388 and stored within pixel cache 360 before it is needed for the corresponding pipeline operation. As such, after issuing a memory request in most cases, the graphics pipeline does not have to wait a long time for the data to arrive before proceeding with its operation. Indeed, it is appreciated that even if cache misses are encountered successively, the graphics sub-system of the present invention is able to operate without stalling as long as the memory sub-system has the requisite bandwidth. In other words, the graphics pipeline can issue a steady stream of requests and not have to wait between requests. Thus, a high throughput is sustained in the graphics pipeline by taking maximum advantage of the high bandwidth of the memory sub-system.

In sum, embodiments of the present invention advantageously mask the inherent memory latency in a graphics computer system by implementing a cache configured to store 2-D arrays of data in conjunction with pre-fetching of data into the cache. By caching pixel data in tiles, much of the data can be reused due to the spatial locality of 2-D graphics primitives. Effective caching enables large blocks of data to be retrieved in bursts from memory without much waste, thereby taking maximum advantage of the high bandwidth of the memory sub-system. As a beneficial result, significant performance enhancement is achieved. Furthermore, by pre-fetching data into a FIFO queue, embodiments of the present invention enables a steady stream of requests to be issued by a graphics pipeline without having to wait for the data to arrive between requests. As such, a high throughput graphics pipeline offering significant performance improvements over the prior art is provided by embodiments of the present invention.

The preferred embodiment of the present invention, an efficient graphics pipeline with a pixel cache and data-pre-fetching, is thus described. While the present invention has been described in particular embodiments, it should be appreciated that the present invention should not be construed as limited by such embodiments, but rather construed according to the below claims.

What claimed is:

1. A method for processing graphics data in a graphics pipeline of a computer system, said graphics data comprising color data, stencil z-buffer data, and texture data, said graphics pipeline comprising a color pipeline for processing the color data, the stencil z-buffer pipeline for processing the stencil z-buffer data, and the texture pipeline for processing the texture data, said method comprising the steps of:
   a) storing said graphics data within a memory sub-system of said computer system, said memory sub-system having an inherent memory latency;
   b) traversing graphics primitives of said graphics data to generate pixel coordinates for pixels corresponding to said graphics primitives;
   c) generating cache addresses for said pixels based on said pixel coordinates;
   d) pre-fetching said graphics data such that said graphics data is retrieved from said memory sub-system before said graphics data is needed; and
   e) storing said graphics data at said cache addresses within a color cache coupled to the color pipeline and dedicated for use by the color pipeline, a stencil z-buffer cache coupled to the stencil z-buffer pipeline and dedicated for use by the stencil z-buffer pipeline, and a texture cache coupled to the texture pipeline and dedicated for use by the texture pipeline such that said graphics data is immediately available when needed despite said inherent memory latency of said memory sub-system.

2. The method as recited in claim 1, further comprising, the step of storing said cache addresses in a pre-fetch queue.

3. The method as recited in claim 1, further comprising the step of storing said pixel coordinates in said pre-fetch queue.

4. The method as recited in claim 1, wherein said pre-fetch queue stores said cache addresses in a first-in first-out (FIFO) manner.

5. The method as recited in claim 1, wherein said at least one of said caches comprises a write-back cache.

6. The method as recited in claim 1, wherein at least one of said caches comprises a set-associative cache.

7. The method as recited in claim 1, wherein at least one of said caches comprises cache lines that are organized as two-dimensional (2-D) arrays.

8. The method as recited in claim 1, further comprising the step of displaying graphics images according to said pixel data on a display.

9. The method as recited in claim 1, wherein at least one of said caches is organized such that primitives that are spatially located proximate each other are located proximate each other in the pixel cache and thereby improving pixel cache hit rate.

10. The method as recited in claim 1, further comprising the step of generating appropriated sized tiles of pixel data for storage in at least one of said caches.

11. The method as recited in claim 1, wherein at least one of said caches comprises a hierarchy of tiles of pixels.

12. A system for processing graphics data comprising color data, stencil z-buffer data, and texture data, the system comprising:
   a graphics pipeline comprising a color pipeline for processing the color data, a stencil z-buffer pipeline for processing the stencil z-buffer data, and a texture pipeline for processing the texture data;
   a memory sub-system in communication with the graphics pipeline for storing graphics data, the communication between the memory sub-system and the graphics pipeline having an inherent memory latency;
   a set of caches comprising a color cache coupled to the color pipeline and dedicated for use by the color pipeline, a stencil z-buffer cache coupled to the stencil z-buffer pipeline and dedicated for use by the stencil z-buffer pipeline, and a texture cache coupled to the texture pipeline and dedicated for use by the texture pipeline;
   wherein the system pre-fetches the graphics data from the memory sub-system to said caches such that the graphics data is retrieved from said memory sub-system and stored in said caches before the graphics data is desired by the graphics pipeline such that the graphics data is immediately available to the graphics pipeline despite the inherent memory latency of the memory sub-system and wherein cache addresses for said caches are generated based on pixel coordinates.

13. The system as recited in claim 12, further comprising a pre-fetch queue coupled to at least one of said caches.

14. The system as recited in claim 13, wherein the pre-fetch queue comprises a first-in first-out pre-fetch queue.

15. The system as recited in claim 13, wherein the pre-fetch queue stores pixel coordinates.

16. The system as recited in claim 13, wherein the pre-fetch queue stores said cache addresses.

17. The system as recited in claim 12, wherein at least one of said caches comprises a write-back cache.

18. The system as recited in claim 12, wherein at least one of said caches comprises a set-associative cache.

19. The system as recited in claim 12, wherein at least one of said caches comprises cache lines that are organized as two-dimensional (2-D) arrays.

20. The system as recited in claim 12, wherein at least one of said caches is organized such that primitives that are spatially located proximate each other are located proximate each other in the pixel cache and thereby improving pixel cache hit rate.

21. The system as recited in claim 12, wherein the system generates appropriated sized tiles of pixel data for storage in at least one of said caches.

22. The system as recited in claim 12, wherein at least one of said caches comprises a hierarchy of tiles of pixels.

* * * * *